US010564000B2

(12) United States Patent
Nakamura (10) Patent No.: US 10,564,000 B2
(45) Date of Patent: Feb. 18, 2020

(54) INFORMATION DISPLAY DEVICE, INFORMATION DISPLAY METHOD, AND INFORMATION DISPLAY PROGRAM

(71) Applicant: HONDA MOTOR CO., LTD, Minato-ku, Tokyo (JP)

(72) Inventor: Yusuke Nakamura, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 124 days.

(21) Appl. No.: 15/804,055

(22) Filed: Nov. 6, 2017

(65) Prior Publication Data

US 2018/0128634 A1 May 10, 2018

(30) Foreign Application Priority Data

Nov. 8, 2016 (JP) .................. 2016-218101

(51) Int. Cl.
| | | |
|---|---|---|
| G01C 21/36 | (2006.01) | |
| B62D 15/02 | (2006.01) | |
| G01C 21/34 | (2006.01) | |
| G05D 1/02 | (2020.01) | |

(52) U.S. Cl.
CPC ..... G01C 21/3644 (2013.01); B62D 15/0255 (2013.01); G01C 21/3461 (2013.01); G01C 21/3664 (2013.01); G01C 21/3679 (2013.01); *B62D 15/025* (2013.01); *G05D 1/021* (2013.01); *G05D 2201/0213* (2013.01)

(58) Field of Classification Search
CPC .............. G01C 21/367; G01C 21/3644; G01C 21/3679; G05D 1/021
USPC .................................................. 701/538, 23
See application file for complete search history.

(56) References Cited

U.S. PATENT DOCUMENTS

| | | | | |
|---|---|---|---|---|
| 2008/0208453 A1* | 8/2008 | Fujimoto | ........... | G01C 21/3446 701/533 |
| 2016/0121907 A1* | 5/2016 | Otake | ................... | B60W 50/14 701/23 |
| 2016/0171787 A1* | 6/2016 | Yohalashet | .......... | G07B 15/063 705/13 |

FOREIGN PATENT DOCUMENTS

| | | |
|---|---|---|
| JP | 2008-290680 | 12/2008 |
| JP | 2015-141054 | 8/2015 |
| JP | 2015-217798 | 12/2015 |
| JP | 2015217798 A * | 12/2015 |
| JP | 2016-090274 | 5/2016 |

OTHER PUBLICATIONS

Japanese Office Action for Japanese Patent Application No. 2016-218101 dated Jun. 19, 2018.

* cited by examiner

*Primary Examiner* — Isaac G Smith
(74) *Attorney, Agent, or Firm* — Amin, Turocy & Watson, LLP (57) ABSTRACT

An information display device includes a display unit that displays a point guidance image in which information relevant to event points included in a route to a destination is arranged in an order from a current position to the destination, and a display control unit that reduces information relevant to the event points when automatic driving for automatically controlling at least one of acceleration and deceleration, and steering of the vehicle is executed, as compared with a case in which the automatic driving is not executed.

7 Claims, 7 Drawing Sheets

INFORMATION DISPLAY DEVICE, INFORMATION DISPLAY METHOD, AND INFORMATION DISPLAY PROGRAM

CROSS-REFERENCE TO RELATED APPLICATION

Priority is claimed on Japanese Patent Application No. 2016-218101, filed Nov. 8, 2016, the content of which is incorporated herein by reference.

BACKGROUND OF THE INVENTION

Field of the Invention

The present invention relates to an information display device, an information display method, and an information display program.

Description of Related Art

In recent years, a technology for automatically controlling at least one of acceleration and steering of a vehicle (hereinafter referred to as "automatic driving") has been studied. In this connection, a technology for acquiring a scheduled travel route of a vehicle including an automatic driving section in which the automatic driving is performed, and displaying various types of information on the scheduled travel route such as a route along which the vehicle travels using automatic driving, a map of surroundings of the route, and a position in which the automatic driving is stopped has been disclosed (for example, Japanese Unexamined Patent Application, First Publication No. 2015-141054).

SUMMARY OF THE INVENTION

In the technology described in Japanese Unexamined Patent Application, First Publication No. 2015-141054, information on the scheduled travel route is displayed during traveling using automatic driving. However, the information on the scheduled travel route is likely to include information that is less of interest to an occupant during automatic driving, such as information on a point through which the vehicle passes.

Aspects according to the present invention have been made in view of such circumstances, and one object of the present invention is to provide an information display device, an information display method, and an information display program capable of suppressing provision of information that is less of interest to an occupant.

In order to solve the above problem, the present invention has adopted the following aspects.

(1) An information display device according to an aspect of the present invention includes a display unit configured to display a point guidance image in which information relevant to event points included in a route to a destination is arranged in an order from a current position to the destination; and a display control unit configured to reduce information relevant to the event points when automatic driving for automatically controlling at least one of acceleration and steering of the vehicle is executed, as compared with a case in which the automatic driving is not executed.

(2) In the aspect (1), the display control unit may reduce the information relevant to at least some of event points that are not relevant to ending execution of the automatic driving among the event points included in the route.

(3) In the aspect (2), the display control unit may display information relevant to an exit set in the route among exits connected to a toll road included in the route.

(4) In the aspect (2), the display control unit may display information relevant to an occupant's stopover point connected to a toll road included in the route among the event points included in the route.

(5) In the aspect (2), the display control unit may display information relevant to a road connection point connected to the route among the event points included in the route.

(6) In any one of the aspects (1) to (5), the information display device may further include a reception unit configured to receive an operation of an occupant, wherein the display control unit may display the reduced information relevant to the event points on the display unit on the basis of the operation received by the reception unit.

(7) In an information display method according to an aspect of the present invention, a computer displays a point guidance image in which information relevant to event points included in a route to a destination is arranged in an order from a current position to the destination on a display unit, and reduces information relevant to the event points when automatic driving for automatically controlling at least one of acceleration and steering of the vehicle is executed, as compared with a case in which the automatic driving is not executed.

(8) An information display program according to an aspect of the present invention causes a computer to execute a process of displaying a point guidance image in which information relevant to event points included in a route to a destination is arranged in an order from a current position to the destination on a display unit, and reducing information relevant to the event points when automatic driving for automatically controlling at least one of acceleration and steering of the vehicle is executed, as compared with a case in which the automatic driving is not executed.

According to the aspects (1), (7), and (8), it is possible to suppress provision of information that is less of interest to an occupant.

According to the aspect (2), it is possible to suppress provision of information that is less of interest to the occupant. Further, according to the aspect (2), it is possible to transfer the fact that automatic driving is currently executed to the occupant so that the fact is more easily understood.

According to the aspect (3), it is possible to provide information that is of interest to the occupant while suppressing provision of information that is less of interest to the occupant. Further, according to the aspect (3), it is possible to call the occupant's attention in order to switch driving to manual driving.

According to the aspect (4), it is possible to provide information that is of interest to the occupant while suppressing provision of information that is less of interest to the occupant. Further, according to the aspect (4), it is possible to cause the occupant to recognize an area around which the vehicle is traveling, and as a result, to suppress disadvantages due to a reduction in the information relevant to the event points.

According to the aspect (5), it is possible to provide information for the occupant selecting a road that the occupant desires to travel without changing the destination. As a result, it is possible to suppress disadvantages due to a reduction in the information relevant to the event points.

According to the aspect (6), even when the information relevant to the event point is reduced, it is possible to display the reduced information according to a request of the occupant and to suppress degradation of convenience.

DETAILED DESCRIPTION OF THE INVENTION

Figure 1:
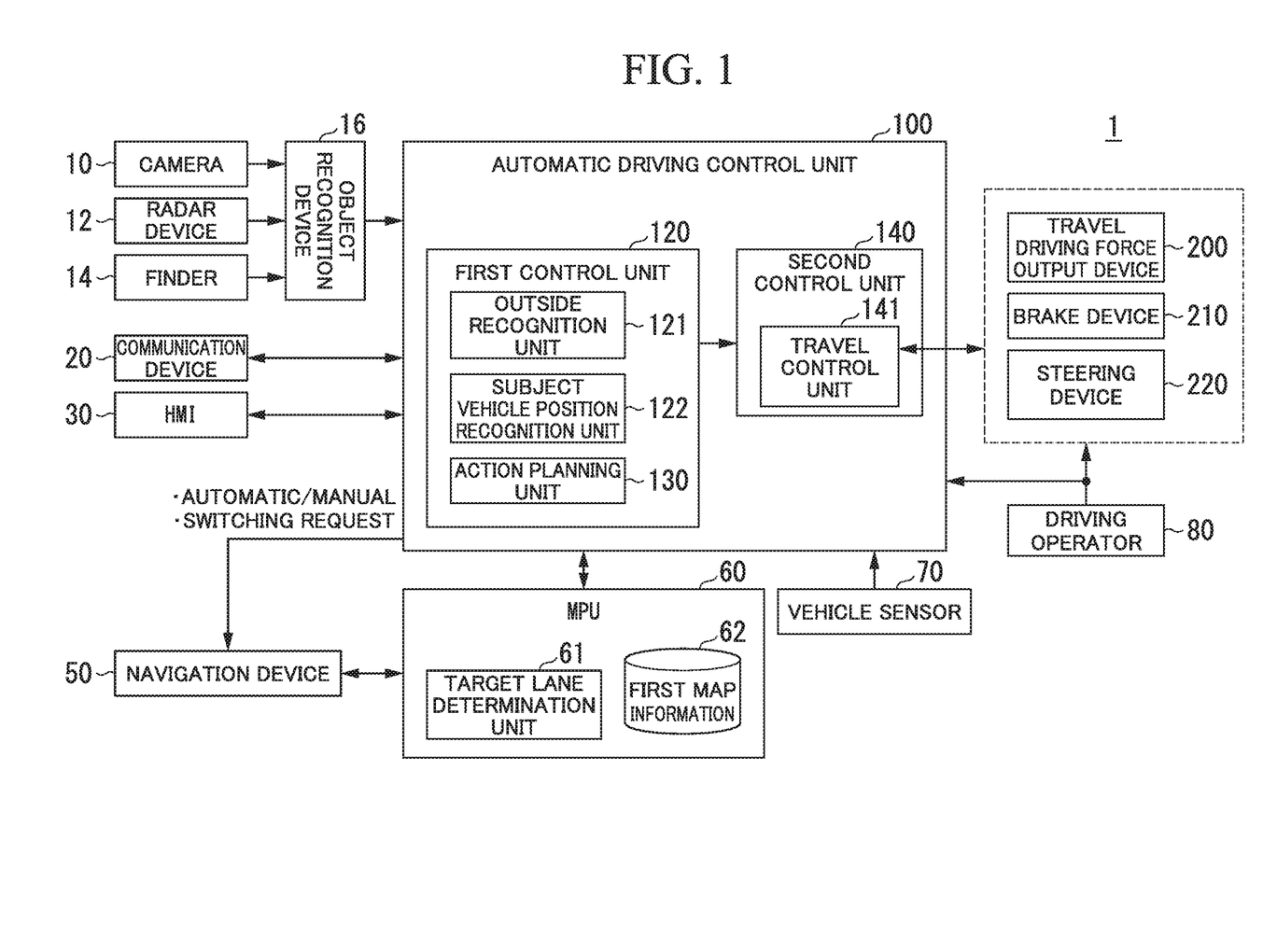
FIG. 1 is a configuration diagram of a vehicle system 1 including an automatic driving control unit 100.

Embodiments of an information display device, an information display method, and an information display program of the present invention will be described below with reference to the drawings. FIG. 1 is a configuration diagram of a vehicle system 1 including an automatic driving control unit 100. A vehicle on which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle system 1 includes, for example, a camera 10, a radar device 12, a finder 14, an object recognition device 16, a communication device 20, a human machine interface (HMI) 30, a navigation device 50, a micro-processing unit (MPU) 60, a vehicle sensor 70, a driving operator 80, an automatic driving control unit 100, a travel driving force output device 200, a brake device 210, and a steering device 220. These devices or units are connected to each other by a multiplex communication line such as a controller area network (CAN) communication line, a serial communication line, a wireless communication network, or the like. The configuration illustrated in FIG. 1 is merely an example, and a part of the configuration may be omitted or another configuration may be added.

The camera 10 is, for example, a digital camera using a solid-state imaging device such as a charge coupled device (CCD) or a complementary metal oxide semiconductor (CMOS). One or more cameras 10 are attached to arbitrary places of a vehicle on which the vehicle system 1 is mounted (hereinafter referred to as a vehicle M). When the front is imaged, the camera 10 is attached to an upper portion of a front windshield, a rear surface of a rearview mirror, or the like. The camera 10, for example, periodically repeats imaging of surroundings of the vehicle M. The camera 10 may be a stereo camera.

The radar device 12 radiates radio waves such as millimeter waves to the surroundings of the vehicle M, and detects radio waves (reflected waves) reflected by an object to detect at least a position (a distance and an orientation) of the object. One or more radar devices 12 are attached to arbitrary places of the vehicle M. The radar device 12 may detect the position and the speed of the object using a frequency modulated continuous wave (FM-CW) scheme.

The finder 14 is a light detection and ranging or laser imaging detection and ranging (LIDAR) that measures scattered light for the radiation light and detects a distance to a target. One or more finders 14 are attached to arbitrary places of the vehicle M.

The object recognition device 16 performs a sensor fusion process on results of detections of some or all of the camera 10, the radar device 12, and the finder 14 to recognize, for example, a position, a type, and a speed of the object. The object recognition device 16 outputs the recognition results to the automatic driving control unit 100.

The communication device 20 communicates with other vehicles near the vehicle M using a cellular network, a Wi-Fi network, Bluetooth (registered trademark), Dedicated Short Range Communication (DSRC), or the like, or communicates with various server devices via a wireless base station such as a VICS (registered trademark).

An HMI 30 presents various types of information to an occupant of the vehicle M and receives an input operation of the occupant. The HMI 30 includes various display devices, speakers, buzzers, touch panels, switches, keys, and the like. An operation unit such as the touch panel, the switch, and the key in the HMI 30 functions as a reception unit that receives an operation of switching a driving mode of the vehicle M to an automatic driving mode. The automatic driving mode is, for example, a driving mode in which the vehicle M is caused to automatically travel along a route to the destination.

The navigation device 50 calculates a route along which the vehicle M travels, and shows the route to the user. Further, the navigation device 50 shows various types of information on the calculated route.

The navigation device 50 will be described in detail below.

The MPU 60 functions as, for example, a target lane determination unit 61 and holds first map information 62 in a storage device such as an HDD or a flash memory. The target lane determination unit 61 divides the route provided from the navigation device 50 into a plurality of blocks (for example, divides the route every 100 [m] in a travel direction of the vehicle), and determines a target lane for each block by referring to the first map information 62. The target lane determination unit 61 performs a determination as to which lane from the left the vehicle travels along. The target lane determination unit 61 determines the target lane so that the vehicle M can travel along a reasonable travel route to a branch destination when there is a branching point, a merging point, or the like in the route.

The first map information 62 is map information of which the accuracy is higher than that of the navigation map DB 53 in the navigation device 50. The first map information 62 includes, for example, information on a center of the lane or information on a boundary of the lane. Further, the first map information 62 may include road information, traffic regulation information, address information (an address and a postal code), facility information, phone number information, or the like. The road information includes information indicating types of roads such as expressways, toll roads, national highways, and prefectural roads, and information such as the number of lanes of roads, widths of the respective lanes, gradients of the roads, positions (three-dimensional coordinates including longitude, latitude, and altitude) of the roads, curvatures of curves of the lanes, positions of merging and branching points of the lanes, and signs provided in the roads. The first map information 62 may be updated at any time by accessing another device using the communication device 20.

The vehicle sensor 70 includes, for example, a vehicle speed sensor that detects a speed of the vehicle M, an acceleration sensor that detects an acceleration, a yaw rate sensor that detects an angular speed around a vertical axis, and an orientation sensor that detects an orientation of the vehicle M.

The driving operator 80 includes, for example, an accelerator pedal, a brake pedal, a shift lever, a steering wheel, and other operators. A sensor that detects the amount of the operation or the presence or absence of operation is attached to the driving operator 80, and a result of the detection is output to one or both of the automatic driving control unit 100 and at least one of the travel driving force output device 200, the brake device 210, and the steering device 220.

The automatic driving control unit 100 includes, for example, a first control unit 120 and a second control unit 140. The first control unit 120 and the second control unit 140 are each realized by a processor such as a central processing unit (CPU) executing a program (software). Further, some or all of functional units of the first control unit 120 and the second control unit 140 to be described below may be realized by hardware such as a Large Scale Integration (LSI), an application specific integrated circuit (ASIC), or a field-programmable gate array (FPGA), or may be realized by software and hardware in cooperation.

The first control unit 120 includes, for example, an outside recognition unit 121, a vehicle position recognition unit 122, and an action planning unit 130.

The outside recognition unit 121 recognizes a state such as a position, a speed, and an acceleration of a nearby vehicle on the basis of the information input from the camera 10, the radar device 12, and the finder 14 via the object recognition device 16. The position of the nearby vehicle may be represented by a representative point such as a centroid or a corner of the nearby vehicle or may be represented by an area represented by an outline of the nearby vehicle. The "state" of the nearby vehicle may include an acceleration, a jerk, or a "state of action" of the nearby vehicle (for example, whether or not the nearby vehicle is changing lanes or intends to change lanes). Further, the outside recognition unit 121 may recognize a position of a guardrail, a telephone pole, a parked vehicle, a pedestrian, or other objects, in addition to the nearby vehicle.

The vehicle position recognition unit 122 recognizes, for example, a lane (travel lane) along which the vehicle M is traveling, and a relative position and posture of the vehicle M relative to the travel lane. The vehicle position recognition unit 122, for example, compares a pattern (for example, an arrangement of a solid line and a broken line) of a road partition line obtained from the first map information 62 with a pattern of a road partition line near the vehicle M recognized from an image captured by the camera 10 to recognize a travel lane. In this recognition, the position of the vehicle M acquired from the navigation device 50 or a result of a process using an inertial navigation system (INS) may be added.

Figure 2:
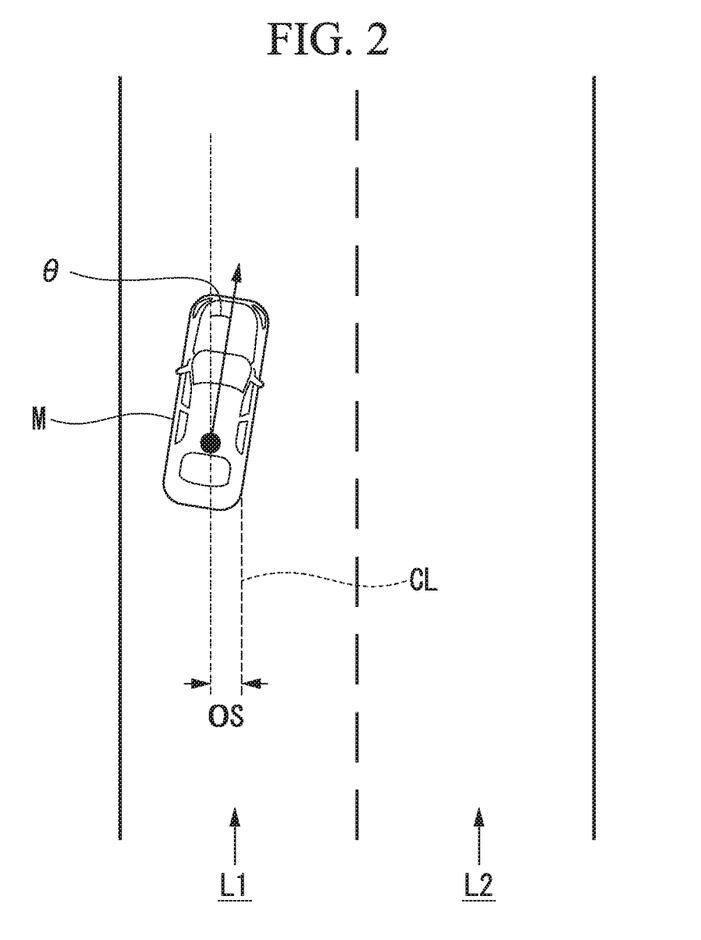
FIG. 2 is a diagram illustrating a state in which a relative position and posture of a vehicle M relative to a travel lane L1 are recognized by a vehicle position recognition unit 122.

The vehicle position recognition unit 122 recognizes, for example, a position or a posture of the vehicle M relative to the travel lane. FIG. 2 is a diagram illustrating a state in which a relative position and posture of the vehicle M relative to the travel lane L1 are recognized by the vehicle position recognition unit 122. The vehicle position recognition unit 122, for example, recognizes a deviation OS of a reference point (for example, a centroid) of the vehicle M from a travel lane center CL and an angle θ of a travel direction of the vehicle M with respect to a line connecting the travel lane center CL as the relative position and posture of the vehicle M relative to the travel lane L1. Alternatively, the vehicle position recognition unit 122 may recognize, for example, a position of the reference point of the vehicle M relative to any one of side end portions of its own lane L1 as a relative position of the vehicle M relative to the travel lane. The relative position of the vehicle M recognized by the vehicle position recognition unit 122 is provided to the target lane determination unit 61 and the action planning unit 130.

The action planning unit 130 determines events to be sequentially executed in the automatic driving so that the vehicle travels along the target lane determined by the target lane determination unit 61 and so that the vehicle M can cope with a surrounding situation of the vehicle M. The events include, for example, a constant-speed traveling event in which a vehicle travels on the same travel lane at a constant speed, a following traveling event in which a vehicle follows a preceding vehicle, a lane changing event, a merging event, a branching event, an emergency stop event, and a handover event in which a vehicle ends automatic driving and switches a driving mode to manual driving. Further, an action for avoidance may be planned on the basis of the surrounding situation of the vehicle M (presence of nearby vehicles or pedestrians, lane narrowing due to road construction, or the like) during execution of these events.

The action planning unit 130 generates a target trajectory along which the vehicle M travels in the future. The target trajectory includes, for example, a speed element. For example, a plurality of future reference times are set at every predetermined sampling time (for example, several tenths of a [sec]), and the target trajectory is generated as a set of target points (trajectory points) at which a vehicle arrives at respective reference times. Therefore, this indicates that, when a width between the trajectory points is great, the vehicle travels at high speed in a section between the trajectory points.

Figure 3:
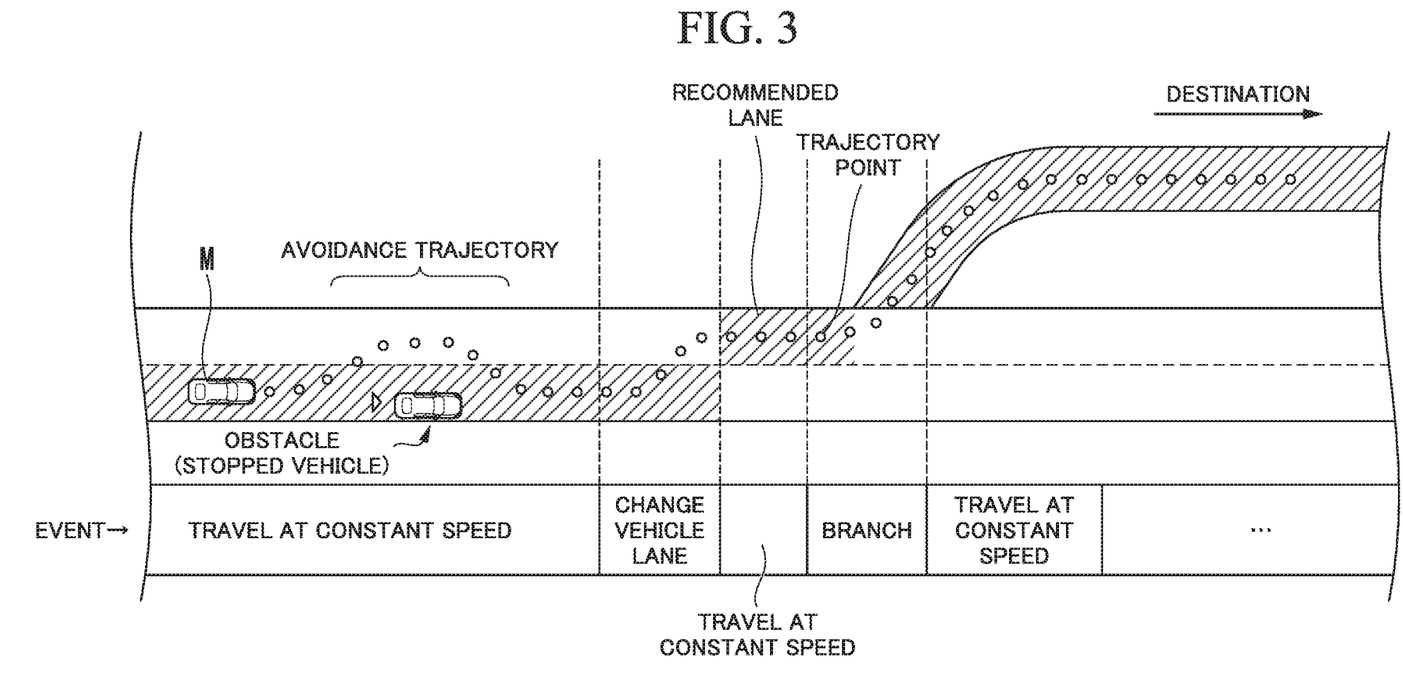
FIG. 3 is a diagram illustrating a state in which a target trajectory is generated on the basis of a target lane when a route is determined by a navigation device 50.

FIG. 3 is a diagram illustrating a state in which the target trajectory is generated on the basis of the target lane when the route is determined by the navigation device 50. As illustrated in FIG. 3, the target lane is set to be convenient for traveling along a route to a destination. When the vehicle arrives at a predetermined distance before a target lane switching point (which may be determined according to a type of the event), the action planning unit 130 activates a lane changing event, a branching event, a merging event, and the like. When it is necessary to avoid an obstacle during execution of each event, an avoidance trajectory is generated as illustrated in FIG. 3. For example, the action planning unit 130 generates a plurality of target trajectory candidates, and selects an optimal target trajectory at that time on the basis of the viewpoint of safety and efficiency. Thus, the automatic driving mode causes the vehicle M to travel along the route to the destination.

The second control unit 140 includes a travel control unit 141. The travel control unit 141 controls the travel driving force output device 200, the brake device 210, and the steering device 220 so that the vehicle M passes through the target trajectory generated by the action planning unit 130 according to a scheduled time.

The travel driving force output device 200 outputs a travel driving force (torque) for causing the vehicle to travel to driving wheels. The travel driving force output device 200 includes, for example, a combination of an internal combustion engine, an electric motor, and a transmission, and an ECU that controls the internal combustion engine, the electric motor, and the transmission. The ECU controls the above configuration according to information input from the travel control unit 141 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to the information input from the travel control unit 141 or the information input from the driving operator 80 so that a brake torque according to a braking operation is output to each wheel. The brake device 210 may include a mechanism that transfers the hydraulic pressure generated by an operation of the brake pedal included in the driving operator 80 to the cylinder via a master cylinder as a backup. The brake device 210 is not limited to the above-described configuration and may be an electronically controlled hydraulic brake device that controls an actuator according to information input from the travel control unit 141 to transfer the hydraulic pressure of the master cylinder to the cylinder.

The steering device 220 includes, for example, a steering ECU and an electric motor.

The electric motor, for example, applies a force to a rack and pinion mechanism to change a direction of a steered wheel. The steering ECU drives the electric motor according to the information input from the travel control unit 141 or the information input from the driving operator 80 to change the direction of the steered wheel.

Figure 4:
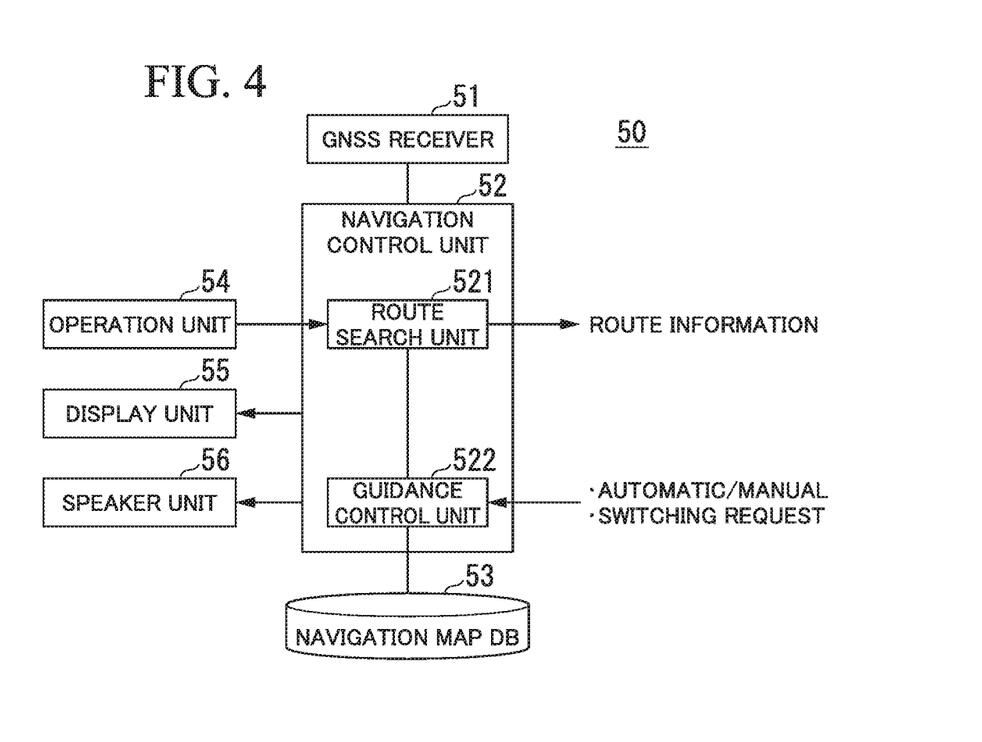
FIG. 4 is a block diagram illustrating an example of the navigation device 50.

Hereinafter, the navigation device 50 in the vehicle system 1 described above will be described. FIG. 4 is a configuration diagram illustrating an example of the navigation device 50. The navigation device 50 includes, for example, a Global Navigation Satellite System (GNSS) receiver 51, a navigation control unit 52, a navigation map DB 53, an operation unit 54, a display unit 55, and a speaker unit 56.

The GNSS receiver 51 specifies the position of the vehicle M on the basis of the signal received from the GNSS satellite. The position of the vehicle M may be specified or complemented by the INS using the output of the vehicle sensor 70.

The navigation map DB 53 is stored in a storage device such as a hard disk drive (HDD) or a flash memory. The navigation map DB 53 is a database in which event point information is included in the map information. The map information is, for example, information in which a road shape is expressed by a link indicating the road and a node connected by the link. Further, the map information may include detailed information relevant to the road, such as a curvature of the road. The event point is a point for which name information for specifying a name of a facility or point is added to position information of the point in the navigation map DB 53.

Figure 5:
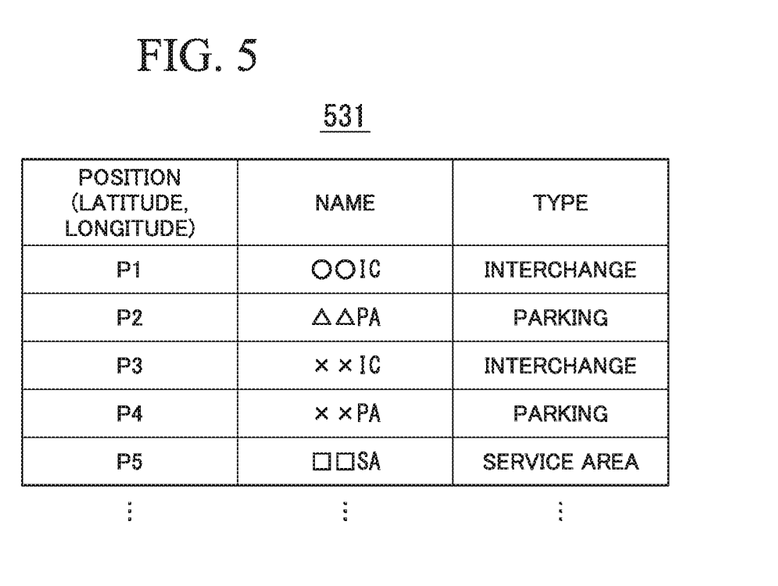
FIG. 5 is a diagram illustrating an example of event point information 531.

FIG. 5 is a diagram illustrating an example of the event point information 531. The event point information 531 is, for example, information in which position information, the name information, and type information are associated with one another. The type information is information indicating a type of facility on the road. The event point information may be, for example, information included in Point Of Interest (POI) information. The event point information includes, for example, a parking area, a service area, an interchange, a junction, and a toll gate as long as the road is a toll road.

The operation unit 54 includes a touch panel, a button, a key, and the like for operating the navigation device 50. The display unit 55 is a liquid crystal display that displays a route or the like guided by the navigation device 50. The speaker unit 56 is a sound output device that outputs sound for guiding the route using the navigation device 50. Some or all of the operation unit 54, the display unit 55, and the speaker unit 56 may be shared with the above-described HMI 30.

The navigation control unit 52 includes, for example, a route search unit 521 and a guidance control unit 522. The route search unit 521 and the guidance control unit 522 are each realized by a processor such as a CPU executing a program (software). Further, some or all of functional units of the route search unit 521 and the guidance control unit 522 to be described below may be realized by hardware such as an LSI, an ASIC, or an FPGA or may be realized by cooperation of software and hardware.

For example, the route search unit 521 determines a route from the position of the vehicle M specified by the GNSS receiver 51 (or an arbitrary input position) to the destination input by an occupant using the operation unit 54 by referring to the navigation map DB 53. The navigation control unit 52 supplies the determined route information to the MPU 60.

The guidance control unit 522 guides information on a travel road on which the vehicle M travels, using the display unit 55 and the speaker unit 56. The guidance control unit 522 corresponds to a display control unit that controls a display of the display unit 55.

Figure 6:
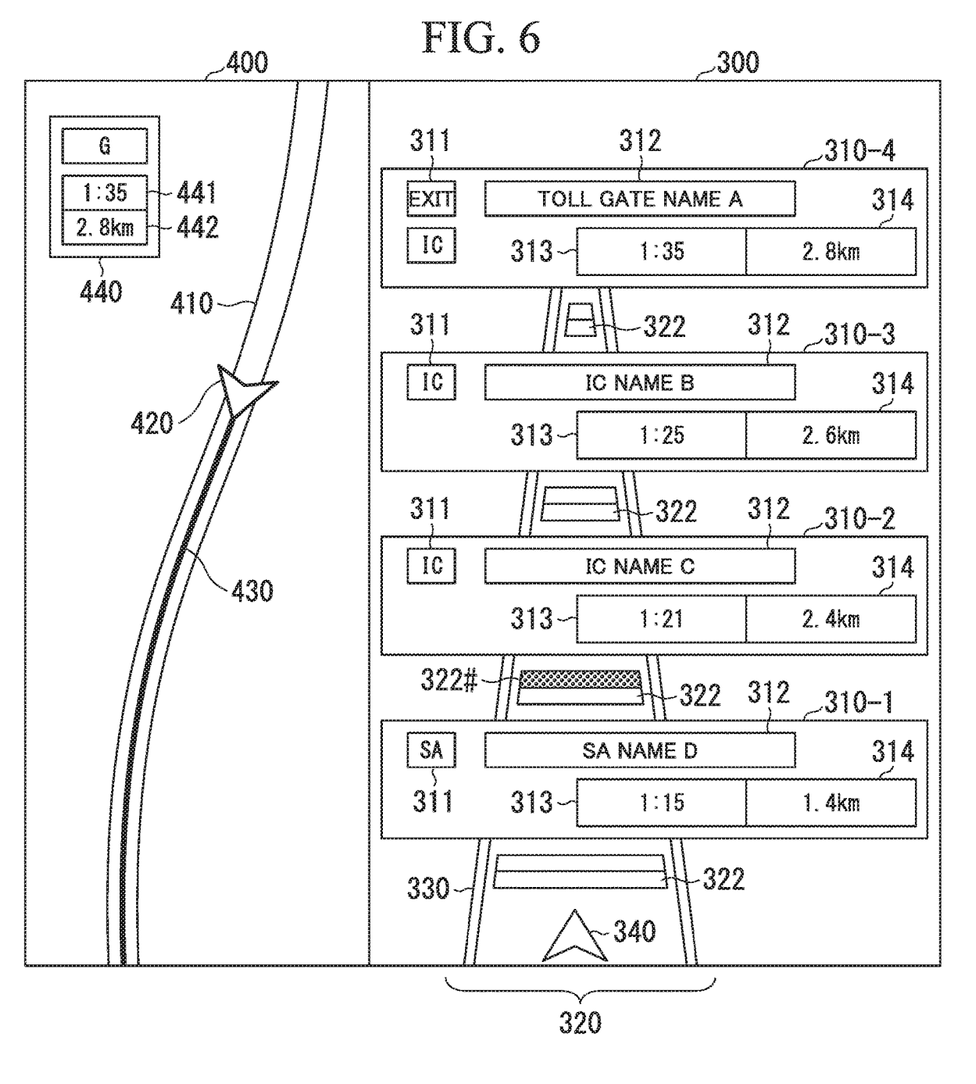
FIG. 6 is a diagram illustrating an example of a display screen including a point guidance image 300 and a route image 400 when a destination is set.

Hereinafter, an operation of guiding the event point on the road on which the vehicle M travels using the above-described navigation device 50 will be described. FIG. 6 is a diagram illustrating an example of a display screen including the point guidance image 300 and the route image 400 when a destination is set.

The point guidance image 300 is an image in which display frames 310-1 to 310-4 for displaying information relevant to an event point included in a route from a traveling point of the vehicle M to the destination in a route searched for by the route search unit 521 are arranged in an order from the traveling point of the vehicle M to the destination. In the example of FIG. 6, the event point includes a service area with a name "D", an interchange with a name "C", an interchange with a name "B", and a toll gate with a name "A".

The display frame 310 includes an image 311 indicating a type of the event point, an image 312 indicating a name of the event point, an image 313 indicating time of arrival at the event point, and an image 314 indicating a distance to the event point. A vehicle image 340 indicating the position of the vehicle M is displayed in an area between a bottom end in the point guidance image 300 and the display frame 310-1 corresponding to the event point closest to the vehicle M in the display frame 310.

A route image 320 is displayed in an area sandwiched between the vehicle image 340 and the display frame 310-1 and an area sandwiched between the display frames 310. The route image 320 is an image that presents that there is an event point corresponding to the display frame 310 on the route and presents a situation of the route between the event points. The route image 320 includes a situation image 322 indicating a situation of the route between the event points. In the situation of the route, for example, an area corresponding to a section in which traffic jam occurs is displayed as a red image 322#.

Further, the point guidance image 300 includes a recommended route image 330. The recommended route image 330 is displayed in an area along the route image 320. The recommended route image 330 is an image indicating that the vehicle M is traveling along the route determined by the route search unit 521. The recommended route image 330, for example, is displayed in predetermined color (for example, green) when the vehicle M is traveling along the route determined by the route search unit 521. When the vehicle M is not traveling along the route determined by the route search unit 521, the recommended route image 330 is not displayed in the point guidance image 300.

The route image 400 is an image indicating information indicating a traveling time or distance from the traveling point of the vehicle M to the destination. The route image 400 is displayed side by side with the point guidance image 300.

The route image 400 includes a travel road image 410, a vehicle image 420, a recommended route image 430, and a destination information image 440.

The travel road image 410 is an image that connects a point on the map corresponding to a point on the road on which the vehicle M is traveling. The vehicle image 420 is an image that is displayed at a point on the map corresponding to a current position of the vehicle M. The recommended route image 430 is an image that connects a point on the map corresponding to a point on the route determined by the route search unit 521. The recommended route image 430 is displayed in predetermined color (for example, green) when the vehicle M is traveling along the route determined by the route search unit 521. The destination information image 440 includes an image 441 indicating a time to arrive at the event point, and image 442 indicating a distance to the event point.

Figure 7:
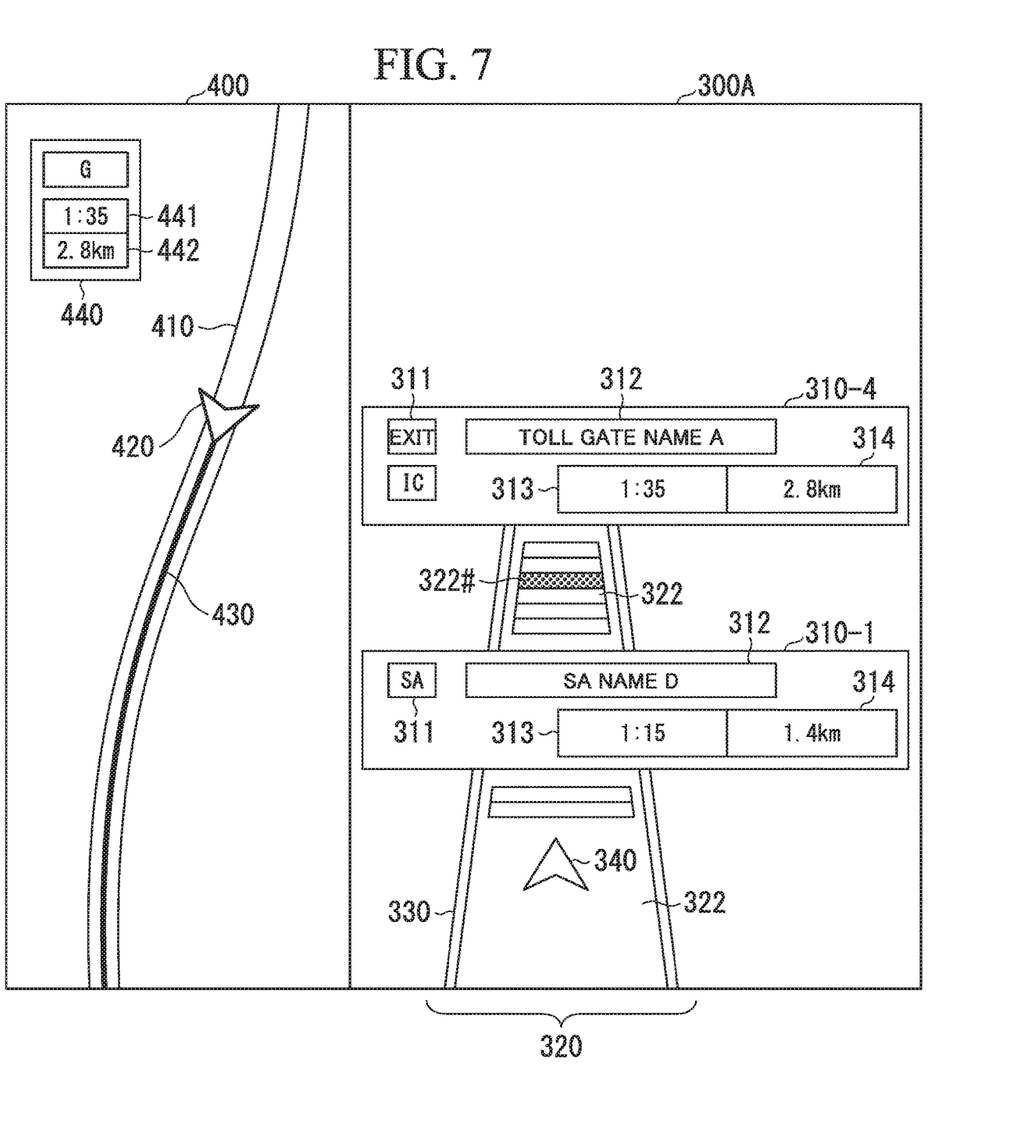
FIG. 7 is a diagram illustrating an example of a display screen including a point guidance image 300A and a route image 400A during automatic driving.

FIG. 7 is a diagram illustrating an example of a display screen including a point guidance image 300A and a route image 400A during automatic driving. When a driving mode of the vehicle M is an automatic driving mode, the guidance control unit 523 displays the point guidance image 300A. The point guidance image 300A includes a display frame 310-4 in which a toll gate with a name of "A" is displayed and a display frame 310-1 in which a service area with a name of "D" is displayed. The display frame 310 for the point guidance image 300A is reduced relative to that for the point guidance image 300. The reduced display frame 310 is the display frame 310 relevant to at least some of the event points not relevant to ending the execution of the automatic driving among the event points included in the route. The event point not relevant to ending the execution of the automatic driving is, for example, an interchange other than an interchange of an exit of the toll road.

That is, the guidance control unit 522 displays the display frame 310-4 as information relevant to the exit through which the vehicle M is caused to pass by executing the automatic driving among exits connected to a toll road included in the route. Further, the guidance control unit 522 displays the display frame 310-1 as information relevant to an occupant's stopover point connected to the toll road included in the route among the event points included in the route.

Further, the guidance control unit 522 displays the information relevant to a road connection point connected to the route among the event points included in the route. The road connection point is also referred to as a junction. When the road including the travel lane is connected to the junction for branching to a connection road connected to the road, the guidance control unit 522 displays the display frame 310 indicating the junction in the automatic driving mode.

Figure 8:
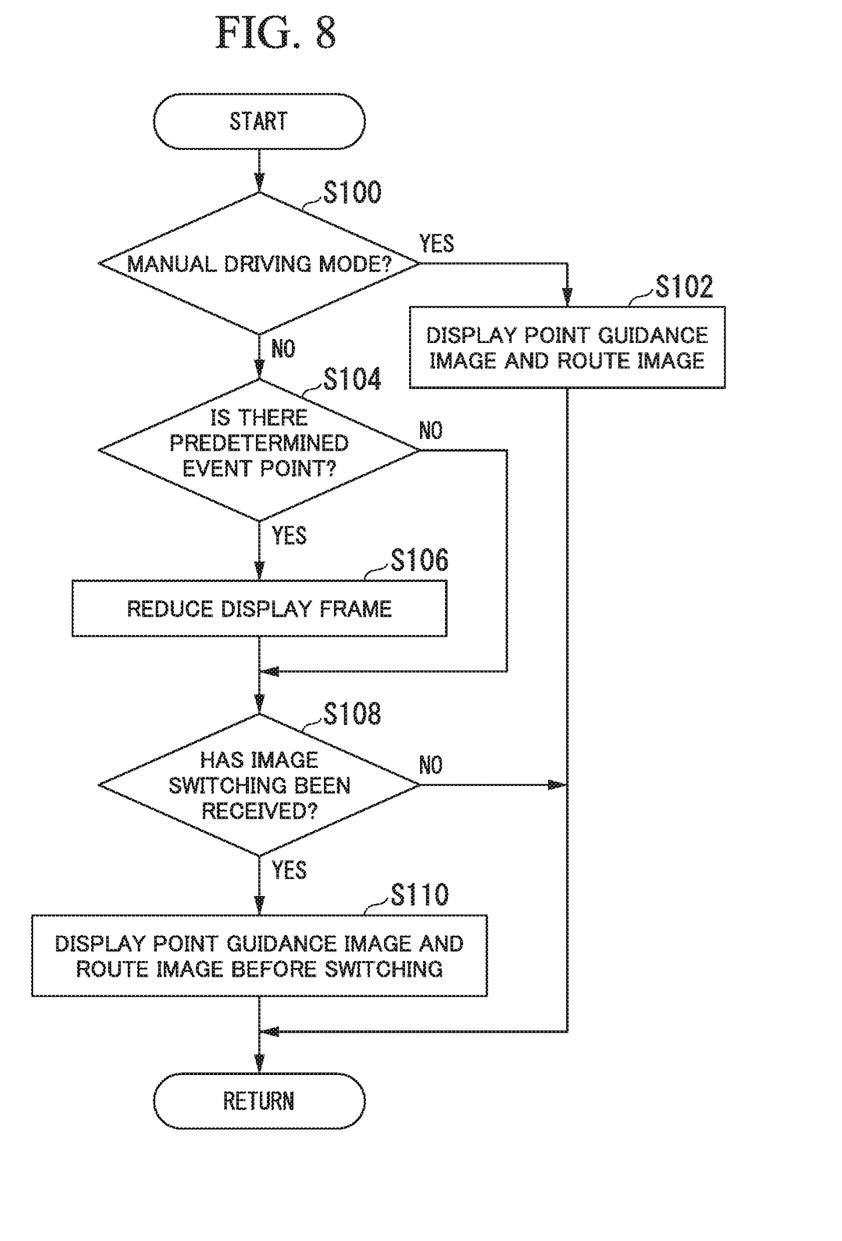
FIG. 8 is a flowchart illustrating a flow of a process of displaying the point guidance image and the route image.

FIG. 8 is a flowchart illustrating a flow of a process of displaying the point guidance image and the route image. First, the navigation device 50 determines whether or not the driving mode of the vehicle M is a manual driving mode on the basis of the information acquired from the automatic driving control unit 100 (step S100). When the driving mode of the vehicle M is the manual driving mode, the navigation device 50 displays the point guidance image 300 and the route image 400 on the display unit 55 and ends the process of the present flowchart (Step S102).

When the driving mode of the vehicle M is not the manual driving mode, the navigation device 50 determines whether or not there is a predetermined event point between the position of the vehicle M and the destination (step S104). The predetermined event point is an event point that is not relevant to ending the execution of the automatic driving. When there is the predetermined event point, the navigation device 50 reduces the predetermined event point from the point guidance image 300, and displays the point guidance image 300A on the display unit 55 (step S106).

When there is no predetermined event point, the navigation device 50 determines whether or not information for switching the point guidance image has been received from the automatic driving control unit 100.

The information for switching the point guidance image is information based on the operation of the HMI 30 and is a command to increase the display frame 310 included in the point guidance image 300A. When the navigation device 50 receives the information for switching the point guidance image, the navigation device 50 displays the point guidance image 300 and the route image 400 before switching the image to the point guidance image 300A in step S106 (step S110). When the navigation device 50 does not receives the information for switching the point guidance image, the process of the present flowchart ends.

As described above, when the automatic driving is being executed, the vehicle system 1 reduces the display frame 310 related to the event point, as compared with a case in which the automatic driving is not executed. Thus, it is possible to suppress provision of information that is less of interest to the occupant.

Further, according to the vehicle system 1, since the information relevant to at least some of event points that are not relevant to ending execution of the automatic driving among the event points included in the route is reduced, it is possible to suppress provision of information that is less of interest to the occupant. Further, according to the vehicle system 1, it is possible to transfer the fact that the current driving mode of the vehicle M is the automatic driving mode to the occupant so that the fact is more easily understood. Further, according to the vehicle system 1, it is possible to provide information on a toll gate or the like relevant to ending the execution of the automatic driving, and to call attention to the occupant in order to switch the driving mode to manual driving. The vehicle system 1 determines that the automatic driving is ended when the vehicle enters a toll gate of a toll road, but the present invention is not limited thereto. The vehicle system 1 may determine a place at which a determination of an occupant is required, to be a place at which the automatic driving is ended.

Further, according to the vehicle system 1, since information relevant to an exit through which the vehicle is caused to pass among exits connected to the toll road included in the route is displayed, it is possible to provide information that is of interest to the occupant while suppressing provision of information that is less of interest to the occupant. Further, according to the vehicle system 1, it is possible to call attention to the occupant in order to switch driving to manual driving.

Further, according to the vehicle system 1, since the information relevant to the occupant's stopover point connected to the toll road included in the route among the event points included in the route is displayed, it is possible to provide information that is of interest to the occupant while suppressing provision of information that is less of interest to the occupant. Further, according to the vehicle system 1, even when the display frame 310 indicating the interchange through which the vehicle M does not pass is reduced, it is possible to cause the occupant to recognize an area around which the vehicle M is traveling by providing information indicating the service area or the parking area. As a result, according to the vehicle system 1, it is possible to suppress disadvantages due to a reduction in the display frame 310 indicating the interchange through which the vehicle M does not pass.

Further, according to the vehicle system 1, since the information relevant to the road connection point connected to the route among the event points included in the route is displayed, it is possible to provide information for the occupant selecting a road that the occupant desires to travel without changing the destination. As a result, the vehicle system 1 can suppress disadvantages due to a reduction in the information relevant to at least some of event points that are not relevant to ending the execution of the automatic driving.

Further, according to the vehicle system 1, since the reduced information relevant to the event points is displayed on the basis of the operation of occupant, it is possible to display the reduced display frame 310 according to a demand of the occupant even when the display frame 310 is reduced during automatic driving. As a result, according to the vehicle system 1, it is possible to suppress a degradation of convenience.

In the above-described embodiments, the example in which the navigation device 50 switches the point guidance image on the basis of the information from the automatic driving control unit 100 has been described, but the present invention is not limited thereto, and when the navigation device 50 and the automatic driving control unit 100 are integrated, the point guidance image is switched by the integrated device.

While the embodiments of the present invention have been described, the present invention is not limited to the embodiments and various modifications and substitutions can be performed without departing from the scope and spirit of the present invention.

What is claimed is:

1. An information display device, comprising:
   a display unit configured to display a point guidance image in which information relevant to event points included in a route to a destination is arranged in an order from a current position to the destination, the event points indicating names of facilities or points; and
   a display control unit configured to reduce, in the point guidance image, information relevant to at least some of event points that are not relevant to ending execution of automatic driving among the event points included in the route when a vehicle travels on the route while the automatic driving is executed, as compared with a case in which the vehicle travels on the route while the automatic driving is not executed, the automatic driving being for automatically controlling at least one of acceleration and steering of the vehicle.

2. The information display device according to claim 1, wherein the display control unit displays information relevant to an exit,
   wherein the exit is an event point of the event points, and
   wherein the exit corresponds to a toll road.

3. The information display device according to claim 1, wherein the display control unit displays information relevant to an occupant's stopover point,
   wherein the occupant's stopover point is an event point of the event points, and
   wherein the occupant's stopover point occurs along a toll road.

4. The information display device according to claim 1, wherein the display control unit displays information relevant to a road connection point connected to the route among the event points included in the route.

5. The information display device according to claim 1, further comprising:
   a reception unit configured to receive an operation of an occupant,
   wherein the display control unit displays the reduced information relevant to the event points on the display unit on the basis of the operation received by the reception unit.

6. An information display method in which a computer:
   displays a point guidance image in which information relevant to event points included in a route to a destination is arranged in an order from a current position to the destination on a display unit, the event points indicating names of facilities or points, and
   reduces, in the point guidance image, information relevant to at least some of event points that are not relevant to ending execution of automatic driving among the event points included in the route when a vehicle travels on the route while the automatic driving is executed, as compared with a case in which the vehicle travels on the route while the automatic driving is not executed, the automatic driving being for automatically controlling at least one of acceleration and steering of the vehicle.

7. A non-transitory machine-readable storage medium, comprising executable instructions that, when executed by a processor of a system, facilitate performance of operations, comprising:
   displaying a point guidance image in which information relevant to event points included in a route to a destination is arranged in an order from a current position to the destination on a display unit, the event points indicating names of facilities or points, and
   reducing, in the point guidance image, information relevant to at least some of event points that are not relevant to ending execution of automatic driving among the event points included in the route when a vehicle travels on the route while the automatic driving is executed, as compared with a case in which the vehicle travels on the route while the automatic driving is not executed, the automatic driving being for automatically controlling at least one of acceleration and steering of the vehicle.

* * * * *